United States Patent [19]

Manor

[11] 4,320,870
[45] Mar. 23, 1982

[54] TEMPERATURE CONTROL SYSTEMS

[76] Inventor: Giora Manor, 19 Kilmer Rd., Larchmont, N.Y. 10538

[21] Appl. No.: 102,805

[22] Filed: Dec. 12, 1979

[51] Int. Cl.³ .......................................... F28F 27/00
[52] U.S. Cl. .................................. 236/37; 236/91 F; 236/84; 165/40
[58] Field of Search ............... 236/37, 38, 91 F, 99 E, 236/99 C, 84; 165/40; 62/209

[56] References Cited

U.S. PATENT DOCUMENTS

| | | | |
|---|---|---|---|
| 2,075,160 | 3/1937 | Baker | 236/37 |
| 2,299,335 | 10/1942 | McGrath | 236/37 X |
| 2,594,477 | 4/1952 | Miner et al. | 236/37 |
| 2,816,712 | 12/1957 | Herreshoff | 236/37 |
| 2,869,832 | 1/1959 | McElgin | 236/37 X |
| 4,017,028 | 4/1977 | Manor | 126/422 X |

*Primary Examiner*—William E. Tapolcai, Jr.
*Attorney, Agent, or Firm*—Ladas & Parry

[57] ABSTRACT

A temperature control system for maintaining a selected location at a preselected temperature comprises a supply of heat transfer fluid, a first control for controlling the temperature of the heat transfer fluid, a heat exchanger for receiving the heat transfer fluid and establishing a heat exchange relationship between the heat transfer fluid and the material at the selected location, a second control for controlling the supply of heat transfer fluid to the heat exchanger, and a thermostat. The thermostat is a differential thermostat having a first sensor to sense the temperature at the selected location and a second sensor to sense the temperature of the heat transfer fluid, and is connected to the second control and is operative to actuate the second control to maintain the difference between the temperatures sensed by the first and second sensors at a selected value. Therefore, adjustment of the first control cause the preselected temperature to be adjusted accordingly.

10 Claims, 3 Drawing Figures

TEMPERATURE CONTROL SYSTEMS

This invention relates to temperature control systems.

It is conventional in large buildings to employ a central heating and cooling system for controlling the temperature of the air within the building. The term "air conditioning" as used herein refers to maintaining the temperature of the air within a predetermined range, whether by supply or removal of heat, and thus covers both heating and cooling the air. In the conventional system, a heat transfer fluid, usually water, is heated and cooled at a central plant in the builing and is delivered through piping to terminal room units, such as induction or fan coil units located throughout the building. These room units are usually at the periphery of the building adjacent the windows, since it is through the windows that most heat is gained or lost by the exterior rooms of the building. Each room unit comprises a heat exchange coil through which the heat transfer liquid passes, and a fan or induction nozzles for drawing room air into the unit, blowing it over the heat exchange coil and discharging it from the unit into the room. Thus, the room air is conditioned by exchanging of heat with the heat transfer fluid.

In order to permit the temperatures of the various rooms of the buildings to be controlled, each room unit is normally provided with a thermostat. The thermostat has a sensor which senses the temperature in the room, for example by sensing the temperature of the air drawn into the unit (the return air) and controls the admission of heat transfer fluid into the heat exchange coil in order to bring the temperature sensed by the sensor to the desired temperature set by the thermostat.

Normally, the room thermostats are variable and are accessible to the room occupants, and therefore a disadvantage with this type of system is that it takes control of the consumption of heat transfer fluid away from the control room for the central plant and places it in the hands of the individual room occupants. (It will be undertood that the heat transfer fluid is not actually consumed by the room unit, but rather it is heated or cooled by exchange of heat with the room air and energy is consumed in bringing the fluid back to its former temperature.) It has recently been decreed in the United States that in order to conserve energy an air conditioning system should not be employed in an office building and most other buildings to bring the temperature below 78° F. in the summer cooling season or above 68° F. in the winter heating season. However, since the temperature of the heat transfer liquid in summer is well below 78° F., it is very difficult for a building operator to comply with this degree because unless the thermostats of the fan coil units are locked, or are preset to limit their range, he has virtually no control over the temperatures set by the individual room occupants.

According to a first aspect of the invention there is provided a temperature control system for maintaining a selected location at a preselected temperature, comprising means for supplying heat transfer fluid, first control means for controlling the temperature of the heat transfer fluid, heat exchange means for receiving the heat transfer fluid and establishing a heat exchange relationship between the heat transfer fluid and material at said location, second control means for controlling the supply of heat transfer fluid to the heat exchange means, and a differential thermostat having a first sensor to sense the temperature at said selected location, a second sensor to sense the temperature of the heat transfer fluid and actuating means connected to said second control means and operative to actuate said second control means to maintain the difference between the temperature sensed by the first and second sensors at a selected value, whereby adjustment of said first control means causes said preselected temperature to be adjusted accordingly.

Large central air conditioning systems employing fan coil or induction room units are either of the two-pipe type or of the four-pipe type. In the four-pipe system, each unit contains two heat exchange coils and the building has two piping networks. One of the piping networks is used for delivering hot water in winter to one of the heat exchange coils while the other network is used for delivering cold water in summer to the other coil. Quite clearly, this type of system is more expensive in terms of piping than the two-pipe system, which uses a single heat exchange coil in each fan coil unit and a single piping network which delivers hot water to the coil in winter and cold water to the coil in summer, and valving is provided in the central heating and cooling plant of the building to control whether the water passes through the central cooler or through the central heater. The two-pipe system, however, has its own disadvantage, in that the thermostats must operate in summer by responding to a rise in room temperature to increase the supply of heat transfer fluid to the heat exchange coil and must respond in winter to a fall in room temperature to increase the supply of fluid to the coil. It is therefore necessary at the end of the heating season and several times during intermediate seasons to change over the thermostat from the winter mode, in which it responds to decrease in temperature, to the summer mode in which it responds to increase in temperature, and vice versa at the end of the cooling season. This is effected manually, by adjusting each thermostat individually, or automatically. The automatic adjustment may be effected in response to change in temperature of the heat transfer fluid. During the cooling season, the heat transfer fluid has a temperature in the region of 52° F., while in the heating season the temperature is at least 90° F. This temperature differrence of at least 38° F., which is much larger than the normal variation in the room temperature, enables a temperature detector mounted on the water supply pipe to the room unit to reverse the response of the thermostat. Thus, when the temperature of the supply pipe is over say 90° F., the temperature sensor causes the thermostat to respond to falling room temperature in order to increase the supply of water to the heat exchange coil whereas when the temperature is below say 60° F. the sensor causes the thermostat to respond to rising room temperature in order to increase the supply of water to the heat exchange coil. This type of thermostat adjustment mechanism can readily be incorporated as an integral part in a temperature control system provided in accordance with the first aspect of the invention. Thus, in accordance with a second aspect of the invention the control system optionally includes a change-over device so that when the temperature sensed by the second sensor exceeds the temperature sensed by the first sensor by a first predetermined limit, the second control means is actuated to increase the supply of heat transfer fluid to the heat exchange means when the temperature sensed by the second sensor exceeds the temperature sensed by the first sensor by an amount greater than a first selected value, whereas when the temperature sensed by the first sensor exceeds the temperature sensed by the second sensor by an amount greater than a second predetermined limit, which may be equal to the first predetermined limit, the control means is actuated to increase the supply of heat transfer fluid to the heat exchange means only when the temperature sensed by the first sensor exceeds the temperature sensed by the second sensor by an amount greater than a second selected value, which may be equal to the first selected value.

For a better understanding of the invention, and to show how the same may be carried into effect, reference will now be made, by way of example, to the accompanying drawings in which.

Figure 1:
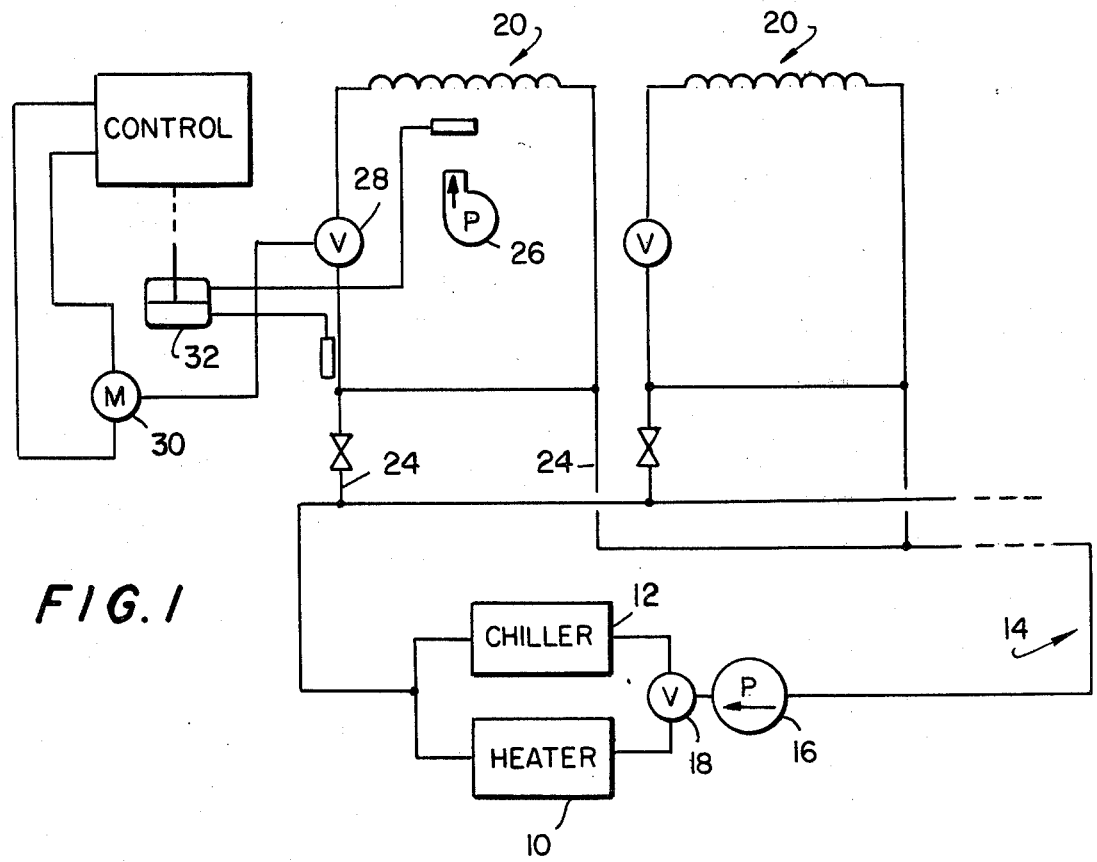
FIG. 1 illustrates diagrammatically a central heating and cooling system.

The heating and cooling system illustrated in FIG. 1 comprises a heater 10 and a chiller 12 which are connected in parallel with one another in a piping network 14 which is provided with a pump 16 and a change-over valving arrangement 18. In one position of the valve 18, the pump 16 pumps water through the piping network 14 by way of the heater 10, where it is heated, and in the other position of the valve 18 the pump 16 pumps water through the piping network by way of the chiller 12, where it is cooled. The water is delivered by the piping network 14 to a plurality of peripheral fan coil room units 20, of which only two are illustrated in FIG. 1. Each room unit comprises a heat exchange coil 22 which is connected in parallel with the main run of the piping network through supply and return branch pipes 24. The room unit further comprises an electrically driven fan 26, and a valve 28 for controlling supply of water from the piping network 14 to the exchange coil 22. The control valve 28 is controlled by an electric operator 30 which drives the valve either to open it or to close it depending upon the signal that it receives from a thermostat 32 by way of a motor control circuit 34. The room unit is provided with a narrow bore bypass pipe connected in parallel with the heat exchange coil 22 to provide a minimum flow even when the control valve 28 is closed. This minimum flow may alternatively be provided by employing a three-way control valve, or a two-way control valve with a minimum flow feature, i.e. a notched seat.

The thermostat 32 is a differential thermostat, embodying essentially the principles of construction described in my U.S. Pat. No. 4,017,028 issued Apr. 12, 1977. The differential thermostat thus comprises a housing 40 defining an interior space which is divided into two chambers 42 and 44 by a flexible diaphragm 46. The diaphragm is essentially planar, and is rendered flexible by the fact that it is very thin, although it may have circular corrugations to increase its flexibilty. The two chambers 42 and 44 are connected to respective expansion bulbs 48 and 50 by way of capillary tubes.

The diaphragm 46 has a rigid support plate 54 to one side of which is secured a rod 52 and to the other side of which is secured a spring retainer over which is fitted one end of a spring 56. The other end of the spring 56 engages a nut carried by a set point adjustment screw 58. The rod 52 and the screw 58 both pass in fluid tight manner to the exterior of the housing 40. Outside the housing the screw 58 carries an adjustment knob 74 and the rod 52 carries an operating member 60 for a rheostat device 62. The rheostat device 62 comprises two individual rheostats 64 and 66 having a common wiper, and is connected to the control circuit for the valve operator 30 by two terminals X and Y. The operating member 60 is a lever having an end 60a pivotally connected to a point which is fixed with respect to the housing 40, an end 60b serving as the common wiper for the rheostats 64 and 66, and an intermediate point 60c connected to the rod 52. The resistor elements of the rheostats 64 and 66 are each connected to the terminal X, and the wiper 60bis connected to the terminal Y. The rheostats are oppositely oriented, i.e. when the first rheostat 64 is wiped to the right of FIG. 2, the resistance across the terminals X and Y is increased, whereas when the second rheostat 66 is similarly wiped the resistance is decreased. The two rheostats are positioned so that only one of them can be wiped at a time and the wiper changes over the from the first rheostat 64 to the second rheostat 66 when the first resistor 64 has been wiped to increase its resistance to its maximum value. An optional variable resistor 68 is connected in series with the rheostats 64 and 66, and is variable manually for fine field adjustment.

The rod 52 is also provided with a primary adjustment mechanism, comprising a screw 70 which is mounted in a bracket fixed with respect to the housing, and a two-way spring 72 which is secured at one end to the screw 70 and its other end to a lateral projection from the rod 52.

Figure 2:
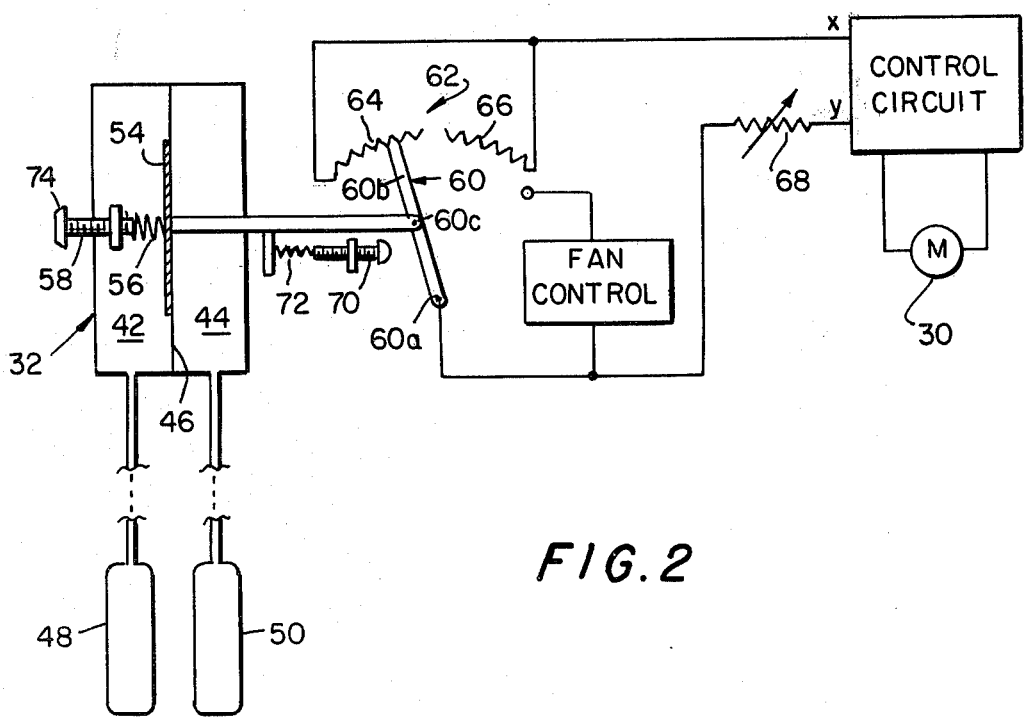
FIG. 2 illustrates a detail of one of the fan coil units of the system of FIG. 1.

The bulb 48 is placed in good thermally conductive contact with the flow branch pipe 24 leading from the piping network 14 to the heat exchange coil 22. The expansion bulb 50 is placed so that it can sense room temperature, for example by placing it in the path of the air entering the room unit for conditioning so that it senses the return air temperature. Thus, the pressure in each of the bulbs 48 and 50, and in the chambers 42 and 44 connected thereto, varies in dependence upon the difference between the water temperature and the air temperature, and accordingly the diaphragm support plate, and the rod 52 secured thereto, takes up a position which depends upon this temperature difference and the setting of the knob 74. During the cooling season, the room temperature is higher than the water temperature and accordingly the diaphragm is positioned to the left (as seen in FIG. 2) of the position which it takes up during the heating season, when the water temperature is higher than the room temperature. The rheostat device, the knob 74 and the primary adjustment mechanism are set so that during the cooling season the wiper 60b wipes the first rheostat 64 whereas during the heating season its wipes the second rheostat 66.

The control circuit 34 actuates the valve operator 30 to open the valve 28 when the resistance between the terminals X and Y falls below a predetermined value. As mentioned above, the resistance between the terminals X and Y decreases when the wiper 60b moves to the left of FIG. 2 over the rheostat 64 i.e. when the air temperature rises, whereas the resistance between the terminals X and Y decreases when the wiper 60b moves to the right of FIG. 2 over the rheostat 66 i.e. when the air temperature falls.

The knob 74 is marked "Warmer" to indicate the direction in which the knob must be turned to urge the diaphragm to the right of FIG. 2 (i.e. the clockwise direction in the event that the screw 58 has a right-hand thread) and "Colder" to indicate the opposite direction.

The knob 74 is accessible to the room occupant, but the range of movement of the knob that can be effected by the room occupant is limited.

In the cooling season, when the water temperature is below the air temperature and the wiper 60b sweeps the rheostat 64, the spring 72 of the primary adjustment mechanism is essentially relaxed so that it does not influence the position of the diaphragm or the resistance between the terminals X and Y. The "coldest" position of the knob 74 correponds to a pre-set maximum difference of say 25° F. between the water temperature and the air temperature. If the knob 74 is set at its "coldest" position, and the chiller is operated so that the temperature of the water in the piping network 14 is 53° F., the air temperature is thereby set at 78° F. By adjusting the knob 74, the room occupant can increase the temperature difference at which the control circuit actuates the valve operator, but he cannot reduce the temperature difference. Thus, the temperature cannot be brought down below 78° F. except by lowering the temperature of the chilled water flowing in the pipe network 14. Accordingly, the building operator maintains control over the consumption of energy by the chiller by making it impossible for the individual occupants to achieve an air temperature below 78° F.

During the heating season, the temperature of the water flowing in the pipe network 14 is at least 90° F. and is thus higher than the air temperature. The diaphragm is therefore displaced to the right of FIG. 4 and the wiper 60b wipes the second rheostat 66 and establishes a resistance between the terminals X and Y below the maximum resistance value of the rheostat 66 and depending upon the temperature difference between the water and the air. Thus, simply by increasing the water temperature sufficiently above the air temperature, the thermostat is automatically changed over from the first rheostat to the second rheostat. The second rheostat is actuated by the operating member 60 in similar manner to that in which the first rheostat is actuated, i.e. when the air temperature falls too far below the water temperature, the member 60 is displaced to the right and the corresponding decrease in the resistance between the terminals X and Y of the control circuit causes the control circuit to actuate the valve operator and open the valve.

In the heating season, when the water temperature is above the air temperature and the wiper 60b sweeps the rheostat 66, the spring 72 of the primary adjustment mechanism is compressed and resists movement of the rod 52 to the right of FIG. 2. The spring 72 thus biases the rod 512 towards the position set by the screw 70. There are then three forces acting on the diaphragm, namely the force of the spring 56 urging the diaphragm to the right, the force owing to pressure difference between the chambers 42 and 44, and the force of the spring 72 urging the diaphragm to the left and increasing as the difference between air temperature and water temperature increases. The effect of the force of the spring 72 is to vary with respect to water temperature the difference between the air temperature and the water temperature, for a given setting of the knob 74, at which the valve operator is actuated. By appropriate selection of the spring 72, the relationship between air temperature and room temperature when the knob 74 is at its "warmest" setting may be preset such as follows:

| Air temperature (°F.)   | 55 | 66  | 67  | 68  | 69  | 70  | 71  | 72  |
|---|---|---|---|---|---|---|---|---|
| Water temperature (°F.) | 90 | 100 | 110 | 120 | 125 | 130 | 135 | 140 |

| Air temperature (°F.)   | 73  | 74  | 75  | 76  | 77  | 78  |
|---|---|---|---|---|---|---|
| Water temperature (°F.) | 145 | 150 | 155 | 160 | 165 | 170 |

The temperature difference between the water and the air to which the control circuit responds is fixed by the control circuit, except that it may be increased by the room occupant by means of the knob 74. This places control of consumption of heat by the room units in the hands of the building operator and takes it out of the hands of the individual room occupants, except insofar as the occupants can lower room temperature during the heating season by increasing the temperature difference and thereby reducing consumption.

By using the air temperature/water temperature schedule set forth above, an automatic night time setback is obtained simply by reducing the water temperature to say 90° F. The rheostat 66 is provided with an optional end switch 76 which can be connected to switch off the fan of the fan coil unit when the water temperature rises to such an extent, for example to 180° F., that the wiper 60b reaches the end of the resistor element of the rheostat 66. The described thermostat has the advantage that it allows the building operator to control the rate of heat transfer by the room units without also allowing the room occupants the same degree of control, and this provides for a more rapid warm up in the heating season and a more rapid cool down in the cooling season. For example, in the heating season the air temperature is typically maintained at 55° F. at night. In the morning the rooms can be quickly heated to 68° F. by raising the water temperature thereby increasing the set point of the thermostats and allowing more water in the coils, and then the water temperature can be reduced to maintain the air temperature at 68° F. With a conventional thermostat having a winter high limit setting of 68° F. the warm up is very slow and in practice perimeter rooms may never reach 68° F. Similarly, a more rapid cool down is provided in the cooling season by use of the described differential thermostat rather than a conventional thermostat having a summer low limit setting of 78° F.

Futhermore, by use of the described differential thermostat the air temperature can be lowered briefly in the cooling season by reducing the water temperature to obtain improved dehumidification. This is impossible with a conventional thermostat having a low limit setting.

In the conventional pneumatically-controlled system, the valve operator comprises a piston or diaphragm acted upon by pressure of air in a supply line and acting against a spring to displace a valve element which in turn controls supply of heat transfer fluid to the heat exchange coil. The control air supply line has a bleed nozzle against which a flap member acts. When the flap member is spaced from the nozzle, it allows air to escape from the control air supply line and so the pressure of air in the valve operator is low. When the flap member engages the nozzle, control air is not permitted to escape and so the pressure of air in the valve operator is high. The flap member is hinged about a fulcrum spaced from bleed nozzle. A room temperature sensor is coupled to the flap member, and the flap member is pivoted towards and away from the bleed nozzle in dependence upon room temperature. A biasing spring, fitted to an adjusting knob, biases the flap member to a position which is adjustable by adjustment of the knob and which corresponds to a selected air temperature. If, in the cooling season (for example), the air temperature exceeds the selected value therefor, the flap member pivots about its fulcrum away from the bleed nozzle to allow air to escape, reducing the pressure in the valve to open the valve and admit chilled heat transfer fluid to the heat exchange coil. As the air temperature is brought down to the selected air temperature, the flap member pivots back towards the bleed nozzle and ultimately closes the nozzle, stopping escape of air, with the result that the pressure in the valve increases and the valve is closed.

Figure 3:
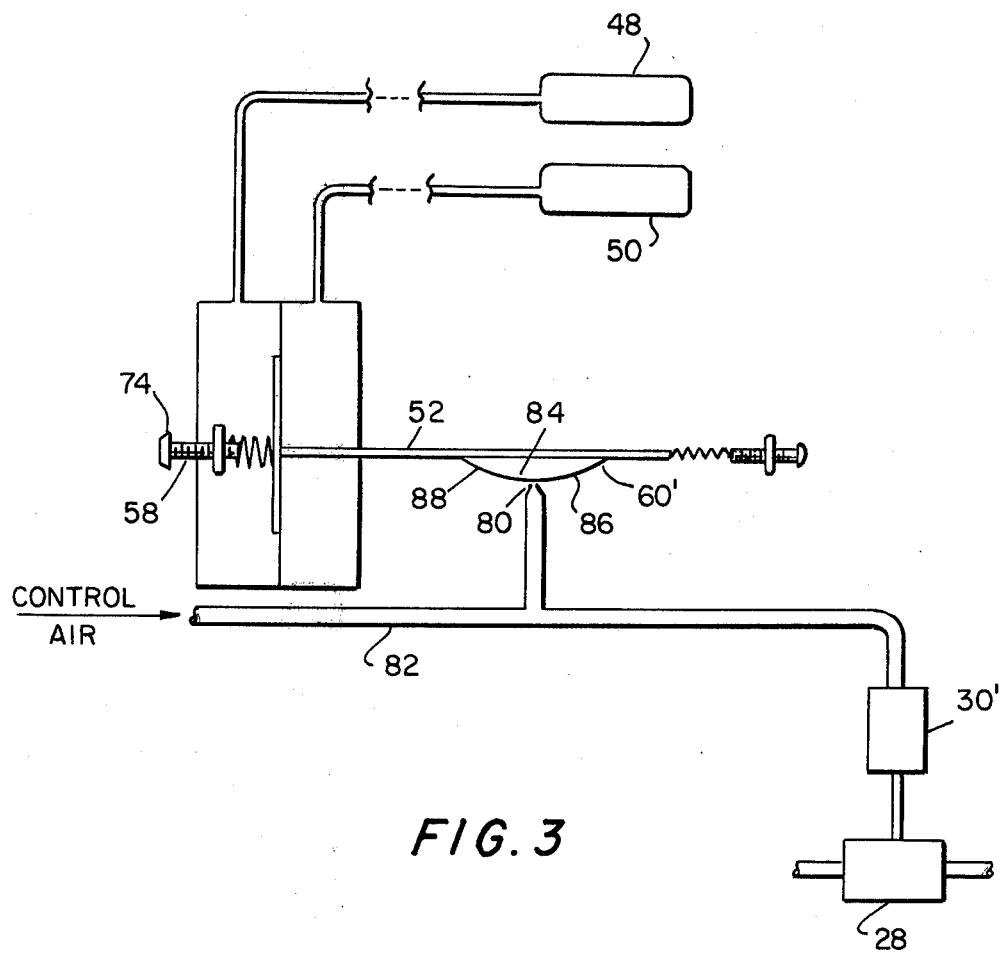
FIG. 3 illustrates a modification of FIG. 2.

This pneumatic system suffers from the same disadvantage as electrical systems, namely the need to reverse its response at the end of the cooling season and at the end of the heating season. It is known to effect this reversal by incorporating a pressure-sensitive change-over valve in each room unit and employing different control air pressures in the respective seasons. FIG. 3 illustrates a device for effecting change over of a pneumatic system from winter mode to summer mode, and vice versa, without need to adjust the control air pressure.

The device illustrated in FIG. 3 is a modification of that shown in FIG. 2. In FIG. 3, the rod 52 of the differential thermostat 32 is provided on one side with a convex control surface 60' which is positioned to engage a bleed nozzle 80 connected to an air supply line 82 which leads to a pneumatic valve operator 30'. The control surface 60' has three regions, namely a central region 84 and two shoulder regions 86 and 88. When the central region 84 is positioned immediately above the nozzle 80, the surface 60' closes off the nozzle and so the pressure in the valve operator is high and the valve remains closed. When the region 84 is displaced to the left or right of the nozzle 80, so that the region 86 or 88 is immediately above the nozzle 80, the surface 60' is clear of the nozzle and so the pressure in the valve operator is low and the valve is opened.

During the heating season, the diaphragm is positioned further to the right than it is in the cooling season, and accordingly the rod 52 is positioned to the right. When the difference between air temperature and water temperature increases, the rod 52 is moved further to the right and the shoulder region 88 is placed above the nozzle 80 and the valve is opened. When the increased supply of heat transfer fluid has resulted in a sufficient increase in air temperature, the rod 52 is moved back to the left and the central region 84 shuts off the nozzle 80 and the valve is closed. Operation during the cooling season is similar, except that the thermostat responds to decrease in temperature difference to clear the nozzle 80 and open the valve.

The temperature difference schedule for summer and winter operation is set for the FIG. 3 device in similar manner to that employed with the FIG. 2 device, i.e. using the primary adjustment mechanism and the screw 58.

It will be appreciated that the invention is not limited to the specific constructions shown and described, since it will be apparent to those skilled in the art that changes may be made without departing from the principles of the invention as defined in the appended claims. For example, the room units may be induction units instead of fan coil units, in which case the fans 26 would be replaced by induction devices. The automatic change over from winter operation to summer operation is an incidental benefit of use of the basic idea of controlling the air temperature by adjusting the water temperature, and is not an essential feature of the invention. Also, the planar diaphragm may be replaced by opposed bellows. In a modification of FIG. 2, the operating member 60 may be used to provide the temperature difference input to something other than a rheostat device. For example, if the valve were controlled by a solenoid, the rheostat may be replaced by a switch controlling supply of energizing current to the solenoid.

I claim:

1. A temperature control system for maintaining a selected location at a preselected temperature, comprising means for supplying heat transfer fluid, adjustable first control means for controlling the temperature of the heat transfer fluid, heat exchange means for receiving the heat transfer fluid and establishing a heat exchange relationship between the heat transfer fluid and material at said location, adjustable second control means for controlling the supply of heat transfer fluid to the heat exchange means, and a differential thermostat having a first sensor to sense the temperature at said selected location, a second sensor to sense the temperature of the heat transfer fluid and actuating means operatively connected to said second control means and operative to actuate said second control means to maintain the difference between the temperatures sensed by the first and second sensors at a selected value, whereby adjustment of said first control means causes said preselected temperature to be adjusted accordingly.

2. A control system as claimed in claim 1, wherein the second control means comprises an electrically-actuable valve and said actuating means includes an actuating member which is displaced in one direction if the temperature sensed by the second sensor increases relative to the temperature sensed by the first sensor and is displayed in the opposite direction if the temperature sensed by the second sensor decreases relative to the temperature sensed by the first sensor, and said actuating means is connected to the second control means through a position sensitive device which includes a rheostat having a resistor element and a wiper which is connected to the actuating member to wipe the resistor element upon displacement of the actuating member, and said position sensitive device further includes a resistance comparison circuit having a first terminal which is connected to the resistor element of the rheostat and a second terminal which is connected to the wiper of the rheostat and which is effective to compare the resistance between the first and second terminals with a predetermined resistance value and, in the event that the resistance between the first and second terminals bears a predetermined relationship to said predetermined resistance value, to generate an electrical control signal for actuating the valve.

3. A control system as claimed in claim 1, wherein said second control means comprises a pneumatically-actuable valve which is senstive to pressure of gas supplied thereto and is connected to a source of gas under pressure and to a bleed nozzle, and wherein said actuating means includes an actuating member which is displaced in one direction if the temperature sensed by one of the first and second sensors increases relative to the temperature sensed by the other sensor and is displaced in the opposite direction if the temperature sensed by said one sensor decreases relative to the temperature sensed by said other sensor and said actuating member has a control surface which is moved towards and away from said bleed nozzle when the actuating member is displaced in said one direction and said opposite direction respectively, thereby to close off and clear the nozzle respectively.

4. A control system as claimed in claim 1, wherein the differential thermostat comprises a housing having mounted therewithin a flexible diaphragm which divides the interior of the housing into first and second chambers, and the first and second sensors comprise, respectively, first and secod vessels having their interiors in communication with the first and second chambers respectively, the first vessel and the first chamber containing thermally expansible fluid sealed therewithin and the second vessel and the second chamber also containing thermally expansible fluid sealed therewithin, and the actuating means includes an actuating member mounted so as to be displaced by the diaphragm in dependence upon difference in pressure between the first and second chambers.

5. A control system as claimed in claim 1, wherein the actuating means assumes a first operating condition when the temperature sensed by the second sensor exceeds the temperature sensed by the first sensor by a first predetermined limit and a second operating condition when the temperature sensed by the first sensor exceeds the temperature sensed by the second sensor by a second predetermined limit, and includes means operative when the actuating means is in the first operating condition to actuate the second control means to increase the supply of heat transfer fluid to the heat exchange means only when the temperature sensed by the second sensor exceeds the temperature sensed by the first sensor by an amount greater than a first selected value and operative when the actuating means is in the second operating condition to actuate the second control means to increase the supply of heat transfer fluid to the heat exchange means only when the temperature sensed by the first sensor exceeds the temperature sensed by the second sensor by an amount greater than a second selected value.

6. A control system as claimed in claim 5, wherein said actuating means includes an actuating member which occupies a position in a first range when the temperature sensed by the second sensor exceeds the temperature sensed by the first sensor by the first predetermined limit and is displaced in one direction in that range when the difference in temperatures sensed by the first and second sensors increases, and occupies a position in a second range if the temperature sensed by the first sensor exceeds the temperature sensed by the second sensor by said second predetermined limit and is displaced in the opposite direction within the second range when the difference in temperature sensed by the first and second sensors increases, said actuating member being connected to said second control means through a position sensitive device which is operative to actuate said second control means to increase the supply of heat transfer fluid to the heat exchange means when the actuating member is positioned in said first range at a point beyond, in said one direction, a first selected point corresponding to said first selected value and when the actuating member is positioned in said second range at a point beyond, in said opposite direction, a point corresponding to said second selected value.

7. A control system as claimed in claim 6, wherein said second control means is an electrically-actuable valve and said position sensitive device includes first and second rheostats comprising first and second resistor elements and a common wiper, said common wiper being connected to said actuating member to be displaced thereby and said first and second resistor elements being disposed end to end in the direction of movement of the common wiper, so that upon movement of the actuating member within its first range the common wiper wipes the first resistor element whereas upon movement of the actuating member within its second range the common wiper wipes the second resistor element, and the position sensitive device further includes a resistance comparison circuit having a first terminal connected both to that end of the first resistor element which is remote from the second resistor element and to that end of the second resistor element which is remote from the first resistor element and a second terminal connected to said common wiper, said resistance comparison circuit being operative to compare the resistance between the first and second terminals with a predetermined resistance value and, in the event that the resistance between the first and second terminals bears a predetermined relationship to the predetermined resistance value, to generate an electrical control signal to actuate the valve.

8. A control system as claimed in claim 7, wherein the heat exchange means includes an electrically-driven fan and a control circuit therefor, and the position sensitive device includes an end switch at that end of one of the resistor elements which is remote from the other resistor element and connected to the fan control circuit so that when the common wiper of the first and second rheostats engages said end switch the supply of current to the fan is interrupted by the fan control circuit.

9. A control system as claimed in claim 5, wherein said second control means is a pneumatically-actuable valve, which is connected to means for supplying gas under pressure and to a bleed nozzle and responds to the gas pressure bearing a predetermined relationship to a predetermined value by opening to deliver heat transfer fluid to the heat exchange means, and wherein said changeover device includes said actuating means, and said actuating means includes an actuating member which is displaced in one direction if the temperature sensed by one of the first and second sensors increases relative to the temperature sensed by the other sensor and is displaced in the opposite direction if the temperature sensed by said one sensor decreases relative to the temperature sensed by the other sensor and said actuating member has a control surface which is moved towards and away from said bleed nozzle when the actuating member is moved in said one direction and said opposite direction respectively in a first range and in said opposite direction and said one direction respectively in a second range, thereby to close off and clear the nozzle respectively.

10. A control system as claimed in claim 2, 3, 6 or 9, wherein the differential thermostat has a primary adjustment mechanism including a spring which resists movement of said actuating member in said one direction with a force which increases with movement of said actuating member in said one direction.

* * * * *